(12) United States Patent
Olson et al.

(10) Patent No.: US 11,312,109 B2
(45) Date of Patent: Apr. 26, 2022

(54) COMPOSITE PANEL HAVING NONCOMBUSTIBLE POLYMER MATRIX CORE

(71) Applicant: Mitsubishi Chemical Composites America, Inc., Chesapeake, VA (US)

(72) Inventors: Paul Olson, Chesapeake, VA (US); William Yannetti, Chesapeake, VA (US); James Moses, Portsmouth, VA (US); Michael Bowie, Suffolk, VA (US)

(73) Assignee: Mitsubishi Chemical Composites America, Inc., Chesapeake, VA (US)

( * ) Notice: Subject to any disclaimer, the term of this patent is extended or adjusted under 35 U.S.C. 154(b) by 0 days.

(21) Appl. No.: 17/010,452

(22) Filed: Sep. 2, 2020

(65) Prior Publication Data

US 2022/0063238 A1 Mar. 3, 2022

Related U.S. Application Data

(60) Provisional application No. 63/073,023, filed on Sep. 1, 2020.

(51) Int. Cl.
*B32B 15/16* (2006.01)
*B32B 15/082* (2006.01)
(Continued)

(52) U.S. Cl.
CPC ............... *B32B 15/16* (2013.01); *B32B 5/16* (2013.01); *B32B 5/18* (2013.01); *B32B 15/046* (2013.01);
(Continued)

(58) Field of Classification Search
CPC .......... C08L 27/12–27/20; C08L 27/16; C08K 3/016; C08K 3/22; C08K 3/26;
(Continued)

(56) References Cited

U.S. PATENT DOCUMENTS 4,250,220 A * 2/1981 Schlatter ................. B32B 19/04
428/212
5,403,424 A * 4/1995 Ehrat ...................... B32B 15/08
156/247

(Continued)

FOREIGN PATENT DOCUMENTS

WO WO-2015182702 A1 * 12/2015 ............ C08F 214/18
WO WO-2016017801 A1 * 2/2016 ............... H05K 3/06

OTHER PUBLICATIONS

3M (TM) Dynamar (TM) Polymer Processing Additive FX 5912 Data Sheet, 3M Advanced Materials Division, 2016. (Year: 2016).*
(Continued)

*Primary Examiner* — Monique R Jackson
(74) *Attorney, Agent, or Firm* — Oblon, McClelland, Maier & Neustadt, L.L.P.

(57) ABSTRACT

A composite panel structure of a polymer matrix core sandwiched by metal layers is described. The polymer matrix comprises 1-30 wt % fluoropolymer and 70-99 wt % of a flame retardant mineral. The fluoropolymer may be polyvinylidene fluoride (PVDF) with a high limiting oxygen index, which confers fire resistance properties to the polymer matrix and the composite panel structure. The composite panel structure may be used on the exterior of buildings and may fulfill building code requirements for the polymer matrix core being noncombustible as determined by ASTM E136 and CAN/ULC S114 compliance.

30 Claims, 1 Drawing Sheet

(51) Int. Cl.
E04C 2/292 (2006.01)
B32B 5/18 (2006.01)
B32B 15/085 (2006.01)
B32B 27/30 (2006.01)
B32B 27/32 (2006.01)
B32B 15/04 (2006.01)
C08J 9/35 (2006.01)
B32B 5/16 (2006.01)
E04B 1/94 (2006.01)

(52) U.S. Cl.
CPC .......... B32B 15/082 (2013.01); B32B 15/085 (2013.01); B32B 27/304 (2013.01); B32B 27/32 (2013.01); C08J 9/35 (2013.01); B32B 2250/03 (2013.01); B32B 2260/025 (2013.01); B32B 2260/046 (2013.01); B32B 2264/102 (2013.01); B32B 2264/104 (2013.01); B32B 2264/1023 (2020.08); B32B 2264/1027 (2020.08); B32B 2264/303 (2020.08); B32B 2305/022 (2013.01); B32B 2307/3065 (2013.01); B32B 2419/00 (2013.01); B32B 2607/00 (2013.01); E04B 1/94 (2013.01); E04C 2/292 (2013.01)

(58) Field of Classification Search
CPC .. C08K 3/34; C08K 2003/2227; B32B 15/08; B32B 15/16; B32B 15/082; B32B 15/085; B32B 2250/03; B32B 2266/0235; B32B 2307/3065; B32B 15/043; B32B 2255/06; B32B 27/304; B32B 27/322; C09D 127/12–20; C09D 127/16; H05K 2201/015; H05K 2201/0209; H05K 1/0373; H01B 3/10; H01B 3/025; H01B 3/12; H01B 3/445; C09J 127/12–127/20; C09J 127/16; C09K 21/14; C04B 26/08; C04B 14/303
See application file for complete search history.

(56) References Cited

U.S. PATENT DOCUMENTS

| | | | | |
|---|---|---|---|---|
| 5,507,894 A | * | 4/1996 | Ehrat | C08K 7/28 156/42 |
| 6,153,674 A | * | 11/2000 | Landin | C09K 21/14 524/35 |
| 7,625,974 B2 | * | 12/2009 | Jozokos | C08K 3/0008 524/406 |
| 8,048,519 B2 | | 11/2011 | Rolland et al. | |
| 9,725,542 B2 | * | 8/2017 | Aida | C08F 2/06 |
| 10,414,912 B2 | | 9/2019 | Dittmar et al. | |
| 2003/0013618 A1 | * | 1/2003 | Abramowski | C10M 131/04 508/181 |
| 2004/0019143 A1 | | 1/2004 | Koloski et al. | |
| 2005/0136761 A1 | | 6/2005 | Murakami et al. | |
| 2008/0057333 A1 | * | 3/2008 | Chu | H05K 1/0373 428/612 |
| 2011/0287271 A1 | * | 11/2011 | Reusmann | C09D 5/033 428/457 |
| 2013/0071640 A1 | * | 3/2013 | Szillat | E04B 1/7604 428/215 |
| 2013/0341068 A1 | * | 12/2013 | Prieur | B32B 27/20 174/120 SR |
| 2017/0130009 A1 | * | 5/2017 | Hosoda | B32B 9/005 |
| 2017/0298213 A1 | * | 10/2017 | Dittmar | C08L 23/0853 |
| 2019/0055731 A1 | | 2/2019 | Nasibov | |
| 2019/0144700 A1 | * | 5/2019 | Hosoda | C08F 214/265 216/13 |
| 2019/0283345 A1 | * | 9/2019 | Uesaka | B32B 27/304 |
| 2020/0277316 A1 | * | 9/2020 | Sato | C08L 101/00 |
| 2021/0060900 A1 | * | 3/2021 | Huang | B32B 5/02 |

OTHER PUBLICATIONS

Huber Martinal (RTM) OL-104 LEO (TM)/OL-107 LEO (TM) Technical Data Sheet, May 2019. (Year: 2019).*
Huber Martinal (RTM) ON-320 Technical Data Sheet, Jul. 2017. (Year: 2017).*
Atefi, R., et al "Investigation on New Eco-Core Metal Matrix Composite Sandwich Structure," Life Science Journal 2012;9(2):1077-1079.
Zabek, D, et al., "Graphene ink laminate structures on poly(vinylidene difluoride) (PVDF) for pyroelectric thermal energy harvesting and waste heat recovery," ACS Appl. Mater. Interfaces 2017, 9, 10, 9161-9167.
Huang, S., et al. "Modified Micro-Emulsion Synthesis of Highly Dispersed Al/PVDF Composites with Enhanced Combustion Properties," Adv. Eng. Mater. 2019, 21, 1801330.
International Search Report and Written Opinion of the International Searching Authority dated Sep. 10, 2021 in PCT/US2021/046593, 9 pages.

* cited by examiner

COMPOSITE PANEL HAVING NONCOMBUSTIBLE POLYMER MATRIX CORE

CROSS REFERENCE TO RELATED APPLICATIONS

This application plains the benefit of priority from U.S. Provisional Application No. 63/073,023 filed Sep. 1, 2020, which is incorporated herein by reference in its entirety.

BACKGROUND OF THE INVENTION

Technical Field

The present invention relates to a composite panel structure comprising a noncombustible polymer matrix core of a fluoropolymer and a mineral.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

For panels used in building cladding and siding, those with flame retardant properties and noncombustibility are desirable to protect against the spread of fire and may offer passive fire resistance. These panels usually have a "sandwich" structure, where two external metal layers sandwich an intermediate layer of a flame retardant composition. These panels may be called "sandwich panels," or "metal composite materials," (MCM), and the metal layers may be called "metal skins." Where aluminum is used in the external metal layers, the panels may furthermore be called "aluminum composite materials" (ACM).

Important characteristics for the flame retardant intermediate layer are high flame resistance, heat insulation, and favorable mechanical properties for manufacturing. Typical flame retardant compositions used in the manufacture of building panels are based on blends of a thermoplastic such as polyethylene or ethylene vinyl acetate with up to about 75 wt % of a flame retardant additive such as aluminum hydroxide or magnesium hydroxide. However, cladding fire disasters such as the 2017 Grenfell Tower fire in London and the 2015 Marina Torch fire in Dubai, not to mention several others, have underscored a need for materials with even greater fire resistance and noncombustibility, especially when used on the sides of tall buildings. For this reason, many architectural firms have moved away from MCM type materials towards designing panels with aluminum plate. In fact, there have been doubts that MCM panels could meet testing standards for noncombustibility, particularly in the United States and Canada. These tests generally require satisfaction, after subjecting the material over a specified period of time to a specified temperature, of standards for (1) temperature increase of the sample, (2) mass loss of the sample, and (3) the presence of flame.

With the aim of meeting testing standards for noncombustibility, many improvements have been achieved to improve the flame retardancy of MCM compositions by increasing the amount of flame retardant additives, even up to 90 wt % in some cases. While the incorporation of such high amounts of flame retardant additives leads to high flame retardancy, such compositions have several drawbacks. The incorporation of such high amounts of flame retardant additives results not only in difficulties in the manufacture of the composite panels (for instance, by extrusion or calendering) but may also lead to the deterioration of the mechanical properties of the polymer in the intermediate layer. Thus there is a need for flame retardant panels having improved flame retardancy and having an intermediate layer that can be manufactured with conventional processes.

In the view of the forgoing, one objective of the present invention is to provide a composite panel structure where the intermediate layer is a polymer matrix comprising a flame retardant mineral and a fluoropolymer, and that may also be easily fabricated.

Another objective of the present invention is to provide a composite panel structure where the intermediate layer is a polymer matrix comprising a flame retardant mineral and a fluoropolymer, where the intermediate layer can satisfy the U.S. standard ASTM E136 and/or the Canadian test CAN/ULC S114 for noncombustibility.

BRIEF SUMMARY OF THE INVENTION

According to a first aspect, the present disclosure relates to a composite panel structure having a polymer matrix sandwiched by first and second metal layers. The polymer matrix comprises 1-30 wt % of a fluoropolymer and 70-99 wt % of a flame retardant mineral, based on a total weight of the polymer matrix.

In one embodiment, the polymer matrix comprises 10-30 wt % of a fluoropolymer and 70-90 wt % of a flame retardant mineral, based on a total weight of the polymer matrix.

In one embodiment, the fluoropolymer is polyvinylidene fluoride.

In a further embodiment, the polymer matrix has a second fluoropolymer that is not polyvinylidene fluoride.

In a further embodiment, the second fluoropolymer is polytetrafluoroethylene.

In one embodiment, the fluoropolymer has a limiting oxygen index (LOI) of greater than 20.

In one embodiment, the fluoropolymer has an LOI of at least 40.

In one embodiment, the fluoropolymer has an LOI of at least 90.

In one embodiment, the polymer matrix consists essentially of the fluoropolymer and the flame retardant mineral.

In one embodiment, the fluoropolymer has a melting point in a range of 100-190° C.

In one embodiment, the fluoropolymer has a density in a range of 1,700-1,900 kg/m$^3$.

In one embodiment, the flame retardant mineral is at least one selected from the group consisting of aluminum hydroxide, magnesium hydroxide, calcium carbonate, magnesium carbonate, alumina, and a phyllosilicate.

In one embodiment, the flame retardant mineral is aluminum hydroxide.

In one embodiment, the polymer matrix further comprises polyethylene.

In one embodiment, the polymer matrix is substantially free of stearic acid.

In one embodiment, the polymer matrix has a density in a range of 2,000-2,600 kg/m$^3$.

In one embodiment, the polymer matrix is noncombustible as determined by ASTM E136 compliance.

In one embodiment, the polymer matrix is noncombustible as determined by CAN/ULC S114 compliance.

In one embodiment, the flame retardant mineral s in the form of particles with a mean particle diameter its a range of 20-150 μm.

In one embodiment, the polymer matrix is monolithic, meaning that it is a continuous solid with no pores, holes, or air bubbles.

According to a second aspect, the present disclosure relates to a noncombustible polymer matrix that consists essentially of aluminum hydroxide dispersed in polyvinylidene fluoride.

In one embodiment, the polyvinylidene fluoride has an LOI of at least 20.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude anchor position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2.6H_2O$, and any other hydrated forms or mixtures. $CuCl_2$ includes both anhydrous $CuCl_2$ and $CuCl_2.2H_2O$.

In addition, the present disclosure is intended to include all isotopes of atoms occurring in the present compounds and complexes. Isotopes include those atoms having, the same atomic number but different as numbers. By way of general example, and without limitation, isotopes of hydrogen include deuterium and tritium. Isotopes of carbon include $^{13}C$ and $^{14}C$. Isotopes of nitrogen include and $^{14}N$ and $^{15}N$. Isotopes of oxygen include $^{16}O$, $^{17}O$, and $^{18}O$. Isotopes of nickel include $^{58}Ni$, $^{60}Ni$, $^{61}Ni$, $^{62}Ni$, and $^{64}Ni$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Figure 1:
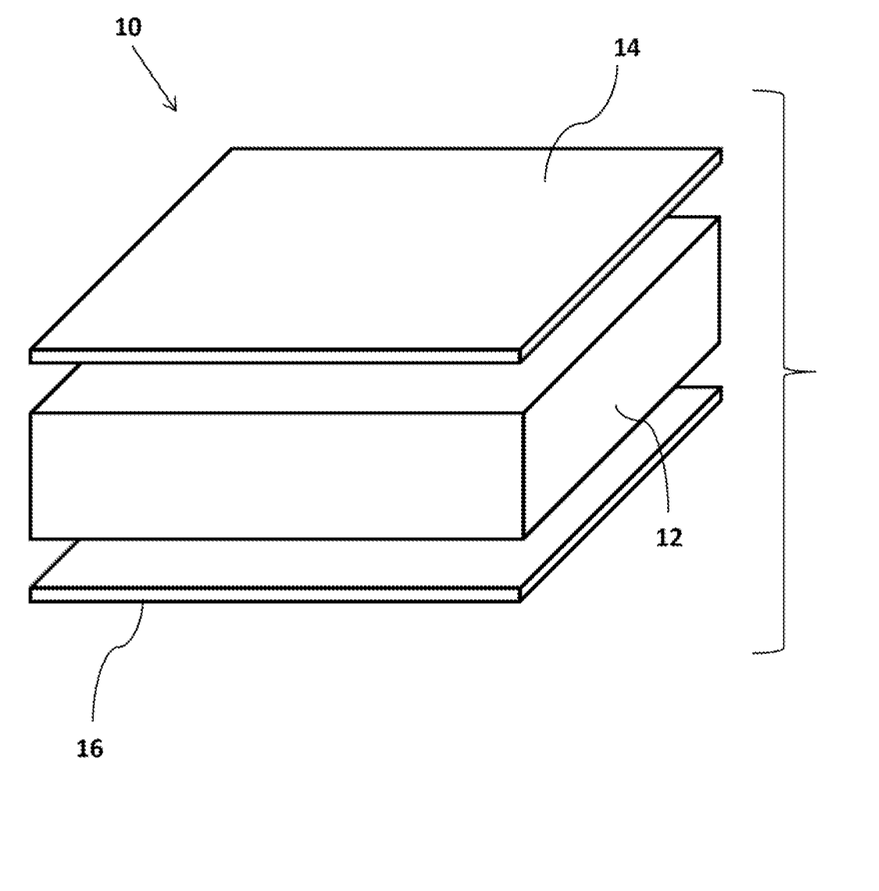
FIG. 1 shows an expanded view of the composite panel structure.

According to a first aspect, the present disclosure relates to a composite panel structure 10 that has a polymer matrix 12 sandwiched between first and second metal layers 14/16. The polymer matrix may also be considered a core or a composite core.

In one embodiment, the polymer matrix is noncombustible. In one embodiment, the noncombustibility of the polymer matrix is determined by the testing standard ASTM E136 (Standard Test Method for Assessing Combustibility of Materials Using a Vertical Tube Furnace at 750° C.). This testing standard sets conditions on the flaming, mass loss, and temperature increase of a sample. For instance, a sample of a polymer matrix measuring 1.5"×1.5"×2.0" having an internal temperature probe and an external surface temperature probe is placed in a 750° C. vertical tube furnace for 30 minutes. Two sets of criteria for noncombustibility exist for the sample based on whether its weight loss is under or over 50 wt %, relative to its weight before being placed in the furnace, if the weight loss is under 50 wt %, for the polymer matrix to be considered noncombustible, at least three of four samples must not flame after the first 30 seconds of being placed in the furnace, and the internal temperature and the external surface temperature do not at any time daring the test rise more than 30° C. above the stabilized furnace temperature, if the weight loss is over 50 wt %, for the polymer matrix to be considered noncombustible, at least three of four samples must not flame at any time during the test, and the internal temperature and external surface temperature do not at any time during the test rise above the stabilized furnace temperature.

In another embodiment, the polymer matrix is considered noncombustible under the Canadian test for combustibility, CAN/ULC S114 (Standard Method of Fire Test of Exterior Wall Assemblies), which uses a similar testing approach as ASTM E136 but has different limits. Generally speaking, however, a material that passes the ASTM E136 testing standard has a likelihood of passing the CAN/ULC S114 standard. In another embodiment, the polymer matrix may be classified as noncombustible with a combustibility rating of A1 or A2. In one embodiment, the composite panel structure is also considered noncombustible by the same standards.

In another embodiment, the polymer matrix and/or composite panel structure additionally meets the ASTM E84 testing standard (Standard Test Method for Surface Burning Characteristics of Building Materials), the NFPA 285 testing standard, and/or Canadian testing standards CAN/ULC S102 and CAN/ULC S134.

In another embodiment, the polymer matrix meets other standards in the International Building Code (IBC), or the building codes of other countries and organizations as a noncombustible material or a flame retardant material.

The metal for the metal layers may be any metal used in the art. Non-limiting examples are metallic materials such as aluminum, aluminum alloys, iron, steel, zinc, tin, zinc-coated iron, copper, and bronze. In one embodiment, both first and second metal layers are made of aluminum or aluminum alloys, although it is conceivable to use two different materials. The metal layers each have an inner and outer surface. The inner surface is in contact with the polymer matrix. Either or both inner and/or outer surfaces of each of the metal layers may be chemically or mechanically pretreated (for instance polished or surface roughened). In one embodiment the metal layers may be finished metal layers.

In some embodiments, an average thickness of one or both metal layers is in a range of 50 µm-1 mm, 100-600 µm, 150-500 µm, or 200-450 µm. A metal layer may have a length and width independently in a range of 0.5-7.0 m, 0.6-4.5 m, or 0.8-3.0 m. In one embodiment, the metal layers are substantially planar, though in some alternative embodiments they may be curved. In one embodiment, the metal layers may be self-supporting. In another embodiment, the metal layers may be provided as a finished metal coil layer. In one embodiment, the metal layers are each provided as a coil or as a preformed sheet.

In one embodiment, an average thickness of the core, or an average spacing between the first and second metal layers, may be in a range of 0.5-5.0 mm, 1.0-4.5 mm, 1.5-4.0 mm, or 2.0-4.0 mm.

In one embodiment, the polymer matrix comprises a fluoropolymer and a flame retardant mineral. In a further embodiment, the polymer matrix consists essentially of the fluoropolymer and the flame retardant mineral. Here, where the polymer matrix consists essentially of the fluoropolymer and the flame retardant mineral, the term "consists essentially of" means that the polymer matrix may it include other ingredients or additives that do not materially affect the ability of the polymer matrix to satisfy the ASTM E136 test for noncombustibility. In a further embodiment, the polymer matrix consists of the fluoropolymer and the flame retardant mineral.

The polymer matrix may comprise the fluoropolymer at a weight percentage in a range of 1-30 wt %, 2-30 wt %, 4-29 wt %, 5-29 wt %, 7-28 wt %, 10-28 wt %, 12-28 wt %, 15-25 wt %, 16-24 wt %, 17-23 wt %, 18-22 wt %, 19-21 wt %, or about 20 wt % relative to a total weight of the polymer matrix. The fluoropolymer may have a known use as a coating or paint, and may be used as a finished compound. PVDF in particular is known in these applications for its high durability and UV resistance. However, in the present disclosure PVDF or some other fluoropolymer may instead be used in the polymer matrix core.

In one embodiment, the fluoropolymer may be at least one selected from the group consisting of polyvinylidene fluoride (PVDF), polyvinyl fluoride (PVF), polychlorotrifluoroethylene, polytetrafluoethylene (PTFE), polychlorotrifluoroethylene (PCTFE), fluorinated ethylene propylene, perfluoroalkoxy polymer (PFA), fluorinated ethylene-propylene (FEP), polyethylenetetrafluoroethylene (ETFE), polyethylenechlorotrifluoroethylene (ECTFE), chlorotrifluoroethylenevinylidene fluoride, tetrafluoroethylene-propylene, perfluoropolyether, perfluorosulfonic acid, and perfluoropolyoxetane. In one embodiment, the fluoropolymer is PVDF, which is a polymer composed of repeating 1,1-difluoroethyl units. In one embodiment, the PVDF may be a commercial preparation, for instance, KYNAR® from Arkema, Inc., KUREHA KF POLYMER® from Kureha Corporation, HYLAR® or SOLEF® from Solvay Specialty Polymers S.p.A, or a PVDF from some other supplier.

In a related embodiment, the polymer matrix comprises two fluoropolymers, which may have a mass ratio or a molar ratio with each other in a range of 1:100-100:1, 1:50-50:1, 1:25-25:1, 1:20-20:1, 1:15-15:1, 1:10-10:1, 1:5-5:1, or 1:2-2:1. In one embodiment, the polymer matrix comprises the fluoropolymers PVDF and PTFE.

In one embodiment, the fluoropolymer has a limiting oxygen index (LOI) of greater than 20. The limiting oxygen index (LOI) is the minimum concentration of oxygen that will support combustion of a polymer. The LOI represents a volume percentage of the oxygen in the atmosphere in contact with the polymer, and as a volume percentage the LOI ranges from 0-100. A higher LOI implies a lower flammability of a material. The LOI described in the present disclosure is determined by the testing standard ASTM D2863, although other LOI testing standards such as ISO 4589 and NET 51-071 (France) typically provide similar test values.

In a further embodiment, the fluoropolymer has an LOI of at least 21, at least 22, at least 23, at least 24, at least 25, at least 30, at least 35, at least 40, at least 42, at least 45, at least 50, at least 55, at least 60, at least 65, at least 70, at least 75, at least 80, at least 85, at least 90, at least 91, at least 92, at least 93, or at least 95.

In a related embodiment, the fluoropolymer has an LOI of greater than about 20, or at least about 21, at least about 22, at least about 23, at least about 24, at least about 25, at least about 30, at least about 35, at least about 40, at least about 42, at least about 45, at least about 50, at least about 55, at least about 60, at least about 65, at least about 70, at least about 75, at least about 80, at least about 85, at least about 90, at least about 91, at least about 92, at least about 93, or at least about 95.

In one embodiment, the fluoropolymer has a melting point in a range of 100-190° C., 105-185° C., 110-180° C., 115-175° C., 120-170° C., 122-165° C., 123-160° C., 124-150° C., 125-145° C., 130-140° C., or 132-138° C.

In one embodiment, the fluoropolymer has a density in a range of 1,700-1,900 kg/m$^3$, 1,720-1,850 kg/m$^3$, 1,730-1,800 kg/m$^3$, 1,750-1,790 kg/m$^3$, or about 1,770 kg/m$^3$, or about 1,780 kg/m$^3$.

In one embodiment, the fluoropolymer has a weight average molecular weight, or a number average molecular weight in a range of 1-1,000 kDa, 10-900 kDa, 20-850 kDa, 30-800 kDa, 40-750 kDa, 50-700 kDa, 60-650 kDa, 70-600 kDa, 80-550 kDa, 90-500 kDa, 100-450 kDa, 110-425 kDa, 120-400 kDa, 130-375 kDa, 140-350 kDa, 150-325 kDa, 155-300 kDa, 160-275 kDa, or 165-260 kDa.

The polymer matrix may comprise the flame retardant mineral at a weight percentage in a range of 70-99 wt %, 70-98 wt %, 70-97 wt %, 71-96 wt %, 71-95 wt %, 72-94 wt %, 72-93 wt %, 72-92 wt %, 72-91 wt %, 72-90 wt %, 72-88 wt %, 73-87 wt %, 75-85 wt %, 74-84 wt %, 76-84 wt %, 77-83 wt %, 78-82 wt %, 79-81 wt %, or about 80 wt % relative to a total weight of the polymer matrix.

The flame retardant mineral is at least one selected from the group consisting of aluminum hydroxide, magnesium hydroxide, magnesium oxide, calcium carbonate, magnesium carbonate, alumina, and a phyllosilicate. In one embodiment, the flame retardant mineral is at least one selected from the group consisting of aluminum hydroxide, magnesium hydroxide, calcium carbonate, and magnesium carbonate.

The phyllosilicate may be at least one selected from the group consisting of vermiculite, antigorite, chrysotile, lizardite, halloysite, kaolinite, illite, montmorillonite, talc, sepiolite, palygorskite (or attapulgite), pyrophyllite, biotite, fuchsite, muscovite, phlogopite, lepidolite, margarite, glauconite, and chlorite. In one embodiment, the phyllosilicate is vermiculite.

In one embodiment, the vermiculite is present as an expanded clay aggregate or a lightweight expanded clay aggregate, (LECA). LECA is made by heating clay to around 1,200° C. in a rotary kiln, where escaping hot gases expand the structure of the clay and the rotary nature of the kiln produces rounded particles. Particles of LECA are generally produced with average diameters in a range of 0.1-25 mm and densities in a range of 200-500 kg/m³. In an alternative embodiment, an expanded clay aggregate is used that is not of vermiculite but of some other clay or phyllosilicate.

In one embodiment, the flame retardant mineral is aluminum hydroxide ($Al(OH)_3$), which may also be called aluminum trihydroxide or ATH. It decomposes endothermically upon heating, producing alumina and water vapor. Aluminum hydroxide may start to decompose around 180° C. (356° F.). At about 220° C. (428° F.), about 35 wt % of the original aluminum hydroxide weight is released as water vapor. Aluminum hydroxide confers two primary advantages as a passive fire protection agent. First, aluminum hydroxide has a high heat of decomposition of 280 cal/g, which is heat it absorbs from a fire. Second, the water vapor released by the mineral may act to dilute the fuel to a fire.

In one embodiment, two or more flame retardant minerals may exist in the polymer matrix, where any two lay have a mass ratio in a range of 1:100-100:1, 1:50-50:1, 1:25-25:1, 1:20-20:1, 1:15-15:1, 1:10-10:1, 1:5-5:1, or 1:2-2:1.

In one embodiment, the flame retardant mineral is in the form of particles with a mean particle diameter in a range of 20-150 μm, 30-140 μm, 50-130 μm, 60-120 μm, 70-110 μm, 80-100 μm, or about 90 μm. As used herein, "mean diameter" refers to the number average particle size based on the largest linear dimension of the particle (sometimes referred to as "diameter"), whether the particle is spherical or not. Diameters, including average, maximum, and minimum particle sizes, may be determined by an appropriate method of sizing particles such as, for example, static or dynamic light scattering (SLS or DLS) using a laser light source.

In one embodiment, the flame retardant mineral has a particle size distribution (PSD) with $d_{50}$ ranging from about 75 μm to about 150 μm, $d_{10}$ ranging from about 40 μm to about 70 μm and a $d_{90}$ ranging about 100 μm to about 200 μm. The term $d_{50}$ means the diameter where half of the volume of the particles have a diameter below this value. Likewise, the term $d_{10}$ means that 10% of the volume of the particles have a diameter below this value, and $d_{90}$ means that 90% of the volume of the particles have a diameter below this value.

In an alternative embodiment, the flame retardant mineral may be in the form of particles with a mean particle diameter in a range of 1-20 μm, 5-15 μm, or 6-12 μm.

In one embodiment, the flame retardant mineral may be in the form of particles having a roughly spherical shape, or may be shaped like boxes, spikes, platelets, stars, discs, rods, granules, prisms, or some other shape. In one embodiment, the particle may be in the form of hexagonal platelets. The flame retardant mineral may be ground or precipitated.

In one embodiment, the flame retardant mineral may be in the form of particles that have an average Wadell sphericity value in a range of 0.3 to 0.8, or 0.3 to 0.7. The Wadell sphericity of a particle is defined by the ratio of the surface area of a sphere (the sphere of a size chosen to have the same volume as the given particle) to the surface area of the particle. The values of Wadell sphericity range from 0 to 1, where a value of 1 is a perfect sphere, and particles become less spherical as their sphericity approaches a value of 0. The Wadell sphericity may be approximated by $$\Psi \approx \left(\frac{bc}{a^2}\right)^{1/3},$$

where a, b, and c are the lengths of the long, intermediate, and short axes, respectively, of an individual particle.

In one embodiment, the particles are monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, less than 10%, less than 8%, less than 6%, or less than 5%. In one embodiment, the particles are monodisperse having a particle diameter distribution ranging from 80% of the average particle diameter to 120% of the average particle diameter, 85-115%, or 90-110% of the average particle diameter. In another embodiment, the particles are not monodisperse.

In embodiment, the polymer matrix may comprise an additional polymeric material. Polymeric materials include one or more thermoplastic polymer compositions such as acrylics (e.g., poly(methyl methacrylate)), terpolymers (e.g., acrylonitrile butadiene styrene), polyamides (e.g., nylon), aromatic polyamides, polyimides, aromatic polyimides, aliphatic polyesters (e.g., polylactic acid), aromatic polyesters, polybenzimidazole, polycarbonates, polyethers, aromatic polyethers, polyether sulfone, aromatic polyether sulfone, polyether ether ketone, polyetherimide, polyethylene, ethylene vinyl acetate (EVA), polyethylene oxide, polyethylene terephthalate, polyphenylene oxide, polyphenylene sulfide, polypropylene, polystyrene, polyvinyl chloride, polymethylene oxide, polytetramethylene oxide, polymethylpentene, polymethyl methacrylate, polycaprolactam, polyacrylonitrile, polybutene, polybutadiene, polyvinyl alcohol, and polyvinylidene chloride. As described here, a "thermoplastic" material is a linear or branched polymer which can be repeatedly softened and made flowable when heated and then returned to a hard state when cooled to room temperature. It generally has an elastic modulus greater than 10.000 psi in accordance with the method of ASTM D638. In addition, thermoplastics can be molded or extruded into articles of any predetermined shape when heated to the softened state.

In one embodiment, the additional polymeric material is polyethylene (PE). The polyethylene may be ultra-high-molecular-weight polyethylene (UHMWPE), high-density polyethylene (HDPE), medium-density polyethylene (MDPE), linear low-density polyethylene (LLDPE), low-density polyethylene (LDPE), and/or very-low-density polyethylene (VLDPE). In one embodiment, the polyethylene is low-density polyethylene (LDPE). A mass ratio of the polyethylene to the fluoropolymer may be in a range of 1:100-100:1, 1:50-50:1, 1:25-25:1, 1:20-20:1, 1:15-15:1, 1:10-10:1, 1:5-5:1, or 1:2-2:1.

In alternative embodiments, the polymer matrix may comprise one or more additional components, including but not limited to silica, fiber glass, glass filler, mica, zinc borate, calcinated clay, mineral wool, antioxidants, carbon black, UV stabilizers, stearic acid, other lubricants, anti-blocking agents, antistatic agents, pigments, titanium dioxide, perlite, talc, diatomaceous earth, zinc oxide, sodium bicarbonate, feldspar, cement, lignosulfonate, magnesium nitrate, calcium oxide, bentonite, dolomite, spinel oxide, belite ($2CaO.SiO_2$), alite ($3CaO.SiO_2$), celite ($3CaO.Al_2O_3$), brownmillerite ($4CaO.Al_2O_3.Fe_2O_3$), other carbonates, other ceramic fillers, carbon black, fibers, metal hydrates, other oxides, reinforcers, release agents, processing aids, and nucleating agents.

In one embodiment, the additive may be a lubricant. Examples of lubricants that may be used include but are not limited to fatty acids, metallic fatty acids, paraffin wax, polyethylene wax, polysiloxanes, polyalkylsiloxanes and polyorganosiloxanes with functional groups, inorganic carbon based compounds such as graphite, and silicate based compounds. Commercial lubricants that may be used are vinyl functionalized polysiloxanes like TERGOMER® V-Si 4042 from Evonik, stearic fatty acids like PRISTERENE® 4913 from Croda, polydimethylsiloxane AK 150® from Wacker, and polyethylene based waxes like A-C 400A and A-C 573 A from Honeywell. In one embodiment, the polymer matrix does not comprise stearic acid or another lubricant. In one embodiment, the polymer matrix is substantially free of stearic acid or another lubricant, meaning that the amount of stearic acid or another lubricant, if present, is not sufficient to affect any material property of the polymer matrix or its fabrication. In one embodiment, the polymer matrix comprises 0.4 wt % or less of stearic acid or another lubricant, 0.3 wt % or less, 0.2 wt % or less, 0.1 wt % or less, 0.05 wt % or less, 0.01 wt % or less, 0.005 wt % or less, 0.001 wt % or less, 0.0005 wt % or less, or 0.0001 wt % or less, relative to a total weight of the polymer matrix. In some cases, a trace amount of stearic acid or another lubricant may be present on equipment used to form the polymer matrix, while the polymer matrix formed is still considered substantially free of stearic acid or another lubricant. In another embodiment, stearic acid or another lubricant is not used in the formation of the polymer matrix.

In one embodiment, the additive, if present, may be in the polymer matrix at a weight percentage in a range of 0.01-20 wt %, 0.05-10 wt %, 0.1-5 wt %, 0.5-3 wt %, 0.7-2.5 wt %, 0.8-2.0 wt %, 0.1-2.0 wt %, 0.5-2.0 wt %, 1.0-10 wt %, or 0.1-1.0 wt % relative to a total eight of the polymer matrix.

As mentioned previously, in one embodiment, the polymer matrix consists of the fluoropolymer and the flame retardant mineral. In another embodiment, the polymer matrix consists essentially of the fluoropolymer and the flame retardant mineral. In one embodiment, the polymer matrix consists of PVDF and aluminum hydroxide. In one embodiment, at least 99.0 wt %, at least 99.5 wt %, at least 99.9 wt %, at least 99.95 wt %, at least 99.99 wt %, at least 99.995 wt %, at least 99.999 wt % of the polymer matrix is fluoropolymer and flame retardant mineral. In an alternative embodiment, the polymer matrix consists of PVDF, PTFE, and the flame retardant mineral. In an alternative embodiment, the polymer matrix consists essentially of PVDF, PTFE, and the flame retardant mineral. In another alternative embodiment, the polymer matrix consists essentially of PVDF, PE, and the name retardant mineral.

In one embodiment, the polymer matrix does not contain any additive, or is substantially free of an additive. More specifically, the polymer matrix does not contain or is substantially free of any of the additives as mentioned previously. In another embodiment the polymer matrix is not formed with an additive or is not formed with any of the additives as mentioned previously.

In one embodiment, the flame retardant mineral, fluoropolymer, and any additives (if present) are dispersed evenly throughout the polymer matrix so that the composition at a 0.1 mm, 0.5 mm, or 1 mm scale does not vary significantly. For instance, the composition within any cubic 0.001 $mm^3$, 0.125 $mm^3$, or 1 $mm^3$ volume of the polymer matrix may not vary significantly. In one embodiment, the polymer matrix is produced as a monolithic shape, meaning that it is a continuous solid with no pores, holes, or air bubbles. In another embodiment, the polymer matrix may have pores or air bubbles having an average diameter of 100 μm or less, 50 μm or less, 10 μm or less, 5 μm or less, 2 μm or less, 1 μm or less, or 0.5 μm or less. In an alternative embodiment, the polymer matrix may be produced with holes in a honeycomb or a waffle pattern, and these holes may be cylindrical, cuboid, or hexagonal, and may or may not traverse all the way through the polymer matrix. In another alternative embodiment, the fluoropolymer or another polymer may be present as a foam or as an expanded polymer. In another alternative embodiment, the polymer matrix may be penetrated by rods or discs that connect both inner surfaces of the first and second metal layers.

In one embodiment, the flame retardant mineral is dispersed in the fluoropolymer in the polymer matrix, meaning that the fluoropolymer forms an extended continual meshwork surrounding a majority of the name retardant minerals. In one embodiment, this extended continual meshwork may extend the length and width of the metal layers. In an alternative embodiment, it may be considered that the fluoropolymer is dispersed in the flame retardant mineral.

In one embodiment, the polymer matrix has a density in a range of 2,000-2,600 $kg/m^3$, 2,150-2,450 $kg/m^3$, 2,180-2,330 $kg/m^3$, 2,200-2,300 $kg/m^3$, 2,225-2,275 $kg/m^3$, 2230-2,270 $kg/m^3$, or about 2,250 $kg/m^3$.

The compositions used in the polymer matrix may be obtained by combining the polymeric components and non-polymeric ingredients by using any melt-mixing method known in the art. For example, the fluoropolymer, flame retardant mineral, and optional additives may be added to a melt mixer, such as, for example, a single or twin-screw extruder; a blender, a single or twin-screw kneader, a Haake mixer, a Brabender mixer, a Banbury mixer, or a roll mixer, either all at once through a single step addition, or in a stepwise fashion, and then melt-mixed. During the melt mixing the polymer matrix components may be heated at a temperature in a range of 100-400° C., or 120-250° C. When adding the polymeric components and non-polymeric ingredients in a stepwise fashion, part of the ingredients may first be added and melt-mixed with the remaining polymeric components, and then the non-polymeric ingredients may be subsequently added and further melt-mixed until a well-mixed composition is produced.

The composite panel structure may be made by extruding the polymer matrix using an extruder, for example, a single screw extruder, twin screw extruder, a pipe extruder, or a screw extruder. Friction may contribute to the heating of the polymer matrix, though in some embodiments heat is added during the extrusion process. In one embodiment, the melt-mixing and the extrusion may be performed in a single step, or continuously within the same extrusion machinery.

The extruded polymer matrix is then transferred to a calendaring device containing one or more pairs of laminating rolls. During the transport from the extruder to the laminating rolls, the polymer matrix may be heated in a range of about 50-250° C. The first and second metal layers are then introduced into the gap between the pair of laminating rolls, which shapes and bonds the polymer matrix to the inner surfaces of the metal layers.

In other embodiments, the polymer matrix may be injection molded, blow molded, compression molded, low pressure injection molded, extruded and then thermoformed by either male or female vacuum thermoforming, injection compression-molding, injection-foaming, injection hollow molding, compression-molding or prepared by a hybrid process such as low pressure molding. These processes may involve a similar melt-mixing process as previously described.

For injection molding, the molding temperature may be in the range of about 100 to about 400° C., about 150 to about 280° C.; the injection pressure is in the range of usually about 5 to about 150 MPa, about 7 to about 100 MPa, about 10 to about 80 MPa; and the mold temperature is in the range of usually about 20 to about 80° C., about 20 to about 60° C. In other embodiments, the composite panel structure or polymer matrix may be formed by other manufacturing methods, such as casting, forming, machining, or joining of two or more pieces.

In one embodiment, following the forming of the polymer matrix and/or composite panel structure, a surface treatment method may be applied, including but not limited to, priming, solvent etching, sulfuric or chromic acid etching, sodium treatment, ozone treatment, flame treatment, UV irradiation, and plasma treatment.

According to a second aspect, the present disclosure relates to a noncombustible polymer matrix that consists essentially of aluminum hydroxide dispersed in PVDF. The noncombustible polymer matrix may contain the PVDF and aluminum hydroxide at weight percentages as previously mentioned for the polymer matrix. In one embodiment the PVDF has an LOI of greater than 20, an LOI of 21 or greater, or an LOI of those previously described for the fluoropolymer. In one embodiment, the noncombustible polymer matrix does not contain or is substantially free of an additive, as discussed previously for the polymer matrix of the composite panel structure. A noncombustible polymer matrix according to the second aspect has surprising noncombustibility as defined by ASTM E136 compliance despite consisting essentially of only aluminum hydroxide and PVDF. See, for example, Formula 11 as follows.

Due to the noncombustibility and fire suppression properties, the polymer matrix and the composite panel structure may be used in various building and construction components, including but not limited to panels for facades, interior walls, partitions, decorative walls, temporary walls, visual displays, flooring, furniture, shutters, doors, roofing, cabinetry, blinds, signage, temporary barriers, cable tray, fume hoods; components for air, automotive, water, and rail vehicles; medical equipment; HVAC components; and electronics and appliance housing.

The examples below are intended to further illustrate protocols for preparing and characterizing the polymer matrix of the composite panel structure and are not intended to limit the scope of the claims. A summary of the formula compositions and results is shown in Table 1.

Materials

PVDF Resin (1.78 g/cm$^3$, 0.7 loss on ignition) was obtained as KYNAR FLEX® 2950-05 from Arkema. Aluminum hydroxide SB-30 ("ATH," 2.42 g/cm$^3$, median particle diameter of 90 µm, 0.347 loss on ignition) was obtained from J.M. Huber Corporation. The recycled glass particles have a density of 2.50 g/cm$^3$ and no loss on ignition. The $CaCO_3$ (2.71 g/cm$^3$, 0.42 loss on ignition) and magnesium hydroxide ("MDH," 2.36 g/cm$^3$, 0.31 loss on ignition) were each obtained from J.M. Huber Corporation. The stearic acid has a density of 0.94 g/cm$^3$. The lightweight expanded clay aggregate (LECA) has a density of 1.67 g/cm$^3$ and no loss on ignition. The unexpanded vermiculite has a density of 2.55 g/cm$^3$ and a 0.31 loss on ignition.

Formula 1

Polymer matrix samples of 1.5"×1.5"×2.0" dimensions were formed, each comprising 29 wt % PVDF, 70 wt % ATH, and 1 wt % stearic acid, each weight percentage relative to a total weight. The samples were subjected to testing standard ASTM E136 (Standard Test Method for Assessing Combustibility of Materials Using a Vertical Tube Furnace at 750° C.). Sample 1 flamed at 18:00 (min:sec) with a 39 wt % loss; Sample 2 flamed at 19:46 with a 38 wt % loss; Sample 3 flamed at 18:52 with a 39 wt % loss. Formula 1 was not found to be in compliance with ASTM E136 for noncombustibility.

Formula 2

Polymer matrix samples of 1.5"×1.5"×2.0" dimensions were formed, each comprising 29 wt % PVDF, 45 wt % ATH, 25 wt % recycled glass particles, and 1 wt % stearic acid, each weight percentage relative to a total weight. The samples were subjected to testing standard ASTM E136. Sample 1 flamed at 4:16; Sample 2 flamed at 4:31; Sample 3 flamed at 4:21. Formula 2 was not found to be in compliance with ASTM E136 for noncombustibility.

Formula 3

Polymer matrix samples of 1.5"×1.5"×2.0" dimensions were formed, each comprising 29 wt % PVDF, 45 wt % ATH, 25.5 w % LECA, and 0.5 wt % stearic acid, each weight percentage relative to a total weight. The samples were subjected to testing standard ASTM E136. Sample 1 flamed at 15:51 with a 30 wt % loss; Sample 2 flamed at 16:00 with a 30 wt % loss; Sample 3 flamed at 15:58 with a 30 wt % loss. Formula 3 was not found to be in compliance with ASTM E136 for noncombustibility.

Formula 4

Polymer matrix samples of 1.5"×1.5"×2.0" dimensions were formed, each comprising 29 wt % PVDF, 45 wt % ATH, 25 wt % $CaCO_3$, and 1 wt % stearic acid, each weight percentage relative to a total weight. The samples were subjected to testing standard ASTM E136. Sample 1 flamed at 2:30; Sample 2 flamed at 2:35; Sample 3 flamed at 2:06. Formula 4 was not found to be in compliance with ASTM E136 for noncombustibility, Formula 5

Polymer matrix samples of 1.5"×1.5"×2.0" dimensions were formed, each comprising 100 wt % PVDF. The samples were subjected to testing standard ASTM E136. Sample 1 flamed at 16:00 with a 23 wt % loss and a 130° C. internal temperature increase above the furnace temperature; Sample 2 flamed at 15:26 with a 23 wt % loss and a 180° C.

internal temperature increase above the furnace temperature. Formula 5 was not found to be in compliance with ASTM E136 for noncombustibility.

Formula 6

Polymer matrix samples of 1.5"×1.5"×2.0" dimensions were formed, each comprising 99 wt % PVDF, and 1 wt % stearic acid, each weight percentage relative to a total weight. The samples were subjected to testing standard ASTM E136. Sample 1 flamed at 2:11; Sample 2 flamed at 1:22. Formula 6 was not found to be in compliance with ASTM E136 for noncombustibility.

Formula 7

Polymer matrix samples of 1.5"×1.5"×2.0" dimensions were formed, each comprising 29 wt % PVDF and 71 wt % ATH, each weight percentage relative to a total weight. The samples were subjected to testing standard ASTM E136. Sample 1 did not flame but over a 27:40 time period experienced a 28 wt % loss and a 53° C. internal temperature increase above the furnace temperature; Sample 2 did not flame but over a 29:55 time period experienced a 28 wt % loss and a 3.1° C. internal temperature increase above the furnace temperature. Formula 7 was not found to be in compliance with ASTM E136 for noncombustibility due to the temperature increases.

Formula 8

Polymer matrix samples of 1.5"×1.5"×2.0" dimensions were formed, each comprising 29 wt % PVDF, 36 wt % ATH, and 35 wt % MDH, each weight percentage relative to a total weight. The samples were subjected to testing standard ASTM E136. The samples flamed after 6 minutes. Formula 8 was not found to be in compliance with ASTM E136 for noncombustibility.

Formula 9

Polymer matrix samples of 1.5"×1.5"×2.0" dimensions were formed, each comprising 29 wt % PVDF and 71 wt % MDH, each weight percentage relative to a total weight. The samples were subjected to testing standard ASTM E136. The samples flamed at 4:20. Formula 9 was not found to be in compliance with ASTM E136 for noncombustibility.

Formula 10

Polymer matrix samples of 1.5"×1.5"×2.0" dimensions were formed, each comprising 29 wt % PVDF, 33 wt % ATH, 33 wt % MDH, and 5 wt % vermiculite, each weight percentage relative to a total weight. The samples were subjected to testing standard ASTM E136. The samples flamed at 5:10. Formula 10 was not found to be in compliance with ASTM E136 for noncombustibility.

Formula 11

Polymer matrix samples of 1.5"×1.5"×2.0" dimensions were formed, each comprising 20 wt % PVDF and 80 wt % ATM, each weight percentage relative to a total weight. Four samples were subjected to testing standard ASTM E136. Over the course of heating, each sample experienced a 27 wt % loss. No sample had a temperature increase above the furnace temperature, and no sample flamed or exhibited visible smoke. Formula 11 was found to be in compliance with ASTM E136 for noncombustibility.

TABLE 1

| | Formula 1 | Formula 2 | Formula 3 | Formula 4 | Formula 5 | Formula 6 | Formula 7 | Formula 8 | Formula 9 | Formula 10 | Formula 11 | |
|---|---|---|---|---|---|---|---|---|---|---|---|---|
| PVDF, wt % | 29% | 29% | 29% | 29% | 100% | 99% | 29% | 29% | 29% | 29% | 20% | PVDF, wt % |
| ATH | 70% | 45% | 45% | 45% | | | 71% | 36% | 71% | 33% | 80% | ATH |
| Glass Particles | | 25% | | | | | | | | | | Glass Particles |
| CaCO₃ | | | | 25% | | | | | | | | CaCO₃ |
| LECA | | | 25.5% | | | | | | | | | LECA |
| MDH | | | | | | | | 35% | | 33% | | MDH |
| Vermiculite | | | | | | | | | | 5% | | Vermiculite |
| Stearic Acid | 1% | 1% | 0.5% | 1% | | 1% | | | | | | Stearic Acid |
| Noncombustible by ASTM E136 | N | N | N | N | N | N | N | N | N | N | Y | Noncombustible by ASTM E136 |

The invention claimed is:

1. A building siding or cladding material having a composite panel structure, comprising:
   a polymer matrix as a core sandwiched by first and second metal layers, the polymer matrix comprising:
   10-24 wt % polyvinylidene fluoride having a melting point in a range of 100-160° C., and
   76-90 wt % aluminum hydroxide, each relative to a total weight of the polymer matrix,
   wherein at least 98 wt % of the polymer matrix is polyvinylidene fluoride and aluminum hydroxide.

2. The building siding or cladding material of claim 1, wherein the polymer matrix comprises:
   15-24 wt % polyvinylidene fluoride, and
   76-85 wt % aluminum hydroxide, each relative to the total weight of the polymer matrix.

3. The building siding or cladding material of claim 2, wherein the polymer matrix comprises:
   17-23 wt % polyvinylidene fluoride, and
   77-83 wt % aluminum hydroxide, each relative to the total weight of the polymer matrix.

4. The building siding or cladding material of claim 3, wherein the polymer matrix comprises:
   19-21 wt % polyvinylidene fluoride, and
   79-81 wt % aluminum hydroxide, each relative to the total weight of the polymer matrix.

5. The composite panel structure of claim 1, wherein the first and second metal layers are each in direct contact with the polymer matrix.

6. The building siding or cladding material of claim 1, wherein the polyvinylidene fluoride has a limiting oxygen index of greater than 20.

7. The building siding or cladding material of claim 1, wherein the polyvinylidene fluoride has a limiting oxygen index of greater than 40.

8. The building siding or cladding material of claim 1, wherein the polyvinylidene fluoride has a limiting oxygen index of at least 90.

9. The building siding or cladding material of claim 1, wherein at least 99 wt % of the polymer matrix is polyvinylidene fluoride and aluminum hydroxide.

10. The building siding or cladding material of claim 1, further comprising a fluoropolymer that is not polyvinylidene fluoride.

11. The building siding or cladding material of claim 1, wherein the polymer matrix has a density in a range of 2,000-2,600 kg/m³.

12. The building siding or cladding material of claim 1, wherein the polymer matrix is noncombustible as determined by ASTM E136 compliance.

13. The building siding or cladding material of claim 1, wherein the polymer matrix is noncombustible as determined by CAN/ULC S114 compliance.

14. The building siding or cladding material of claim 1, wherein the aluminum hydroxide is in the form of particles with a mean particle diameter in a range of 20-150 μm.

15. The building siding or cladding material of claim 1, wherein the polymer matrix is monolithic, being a continuous solid with no pores, holes, or air bubbles, and
    wherein the polymer matrix is not penetrated by rods or discs.

16. The building siding or cladding material of claim 1, wherein the polymer matrix consists of polyvinylidene fluoride and aluminum hydroxide.

17. A building siding or cladding, comprising the building siding or cladding material of claim 1.

18. A building siding or cladding material having a composite panel structure, comprising:
    a polymer matrix as a core layer sandwiched by first and second metal layers, the polymer matrix consisting of:
    1-24 wt % polyvinylidene fluoride, and
    76-99 wt % aluminum hydroxide, each relative to the total weight of the polymer matrix,
    wherein the polymer matrix is noncombustible as determined by ASTM E136 compliance.

19. A building siding or cladding, comprising the building siding or cladding material of claim 18.

20. A building siding or cladding material having a composite panel structure, comprising:
    a polymer matrix as an intermediate layer sandwiched by first and second metal layers, the polymer matrix consisting of:
    1-30 wt % polyvinylidene fluoride having a limiting oxygen index of at least 90, and
    70-99 wt % aluminum hydroxide, each relative to the total weight of the polymer matrix,
    wherein the first and second metal layers each have a length or a width independently in a range of 0.5-7.0 m.

21. The building siding or cladding material of claim 20, wherein both the length and the width are independently in a range of 0.5-7.0 m.

22. The building siding or cladding material of claim 20, wherein the polymer matrix is a continuous solid with no pores, holes, or air bubbles, and
    wherein the polymer matrix is not penetrated by rods or discs connecting the inner surfaces of the first and second metal layers.

23. The building siding or cladding material of claim 20, wherein an average thickness of the polymer matrix is in a range of 1.0-5.0 mm.

24. A building siding or cladding, comprising the building siding or cladding material of claim 20.

25. A building siding or cladding material having a composite panel structure, comprising:
    a polymer matrix as a core sandwiched by first and second metal layers, the polymer matrix comprising:
    1-24 wt % polyvinylidene fluoride having a limiting oxygen index of at least 90, and
    76-99 wt % aluminum hydroxide, each relative to the total weight of the polymer matrix,
    wherein at least 98 wt % of the polymer matrix is polyvinylidene fluoride and aluminum hydroxide, and
    wherein an average thickness of the polymer matrix is in a range of 1.0-5.0 mm.

26. The building siding or cladding material of claim 25, wherein the average thickness of the polymer matrix is in a range of 2.0-5.0 mm.

27. The building siding or cladding material of claim 25, wherein at least 99 wt % of the polymer matrix is polyvinylidene fluoride and aluminum hydroxide.

28. The building siding or cladding material of claim 25, wherein the polymer matrix consists of polyvinylidene fluoride and aluminum hydroxide.

29. The building siding or cladding material of claim 25, wherein the polymer matrix is a continuous solid with no pores, holes, or air bubbles, and
    wherein the polymer matrix is not penetrated by rods or discs connecting the inner surfaces of the first and second metal layers.

30. A building siding or cladding, comprising the building siding or cladding Material of claim 25.

* * * * *